United States Patent
Kim et al.

(10) Patent No.: US 9,628,983 B2
(45) Date of Patent: *Apr. 18, 2017

(54) METHOD FOR REPORTING CAPABILITY INFORMATION AND DUAL MODE USER EQUIPMENT ADAPTED THERETO

(71) Applicant: Samsung Electronics Co., Ltd., Suwon-si, Gyeonggi-do (KR)

(72) Inventors: Soenghun Kim, Yongin-si (KR); Gert-Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,685

(22) Filed: Oct. 8, 2015

(65) Prior Publication Data

US 2016/0029209 A1 Jan. 28, 2016

Related U.S. Application Data

(63) Continuation of application No. 13/571,735, filed on Aug. 10, 2012, now Pat. No. 9,167,416.
(Continued)

(30) Foreign Application Priority Data

Aug. 6, 2012 (KR) .................. 10-2012-0085793

(51) Int. Cl.
*H04W 8/22* (2009.01)
*H04L 5/14* (2006.01)
(Continued)

(52) U.S. Cl.
CPC ................. *H04W 8/22* (2013.01); *H04L 5/14* (2013.01); *H04L 43/06* (2013.01); *H04W 88/06* (2013.01)

(58) Field of Classification Search
None
See application file for complete search history.

(56) References Cited

U.S. PATENT DOCUMENTS 8,203,987 B2 6/2012 Iishi et al.
2006/0221872 A1 10/2006 Jones et al.
(Continued)

FOREIGN PATENT DOCUMENTS

CN 101682896 A 3/2010
CN 101998432 A 3/2011
(Continued)

OTHER PUBLICATIONS

Clearwire, E-UTRA capability handling for dual mode UEs (FDD/TDD), 3GPP TSG-RAN Meeting #54, Berlin Germany, Dec. 6-9, 2011, RP 111618.*

(Continued)

*Primary Examiner* — Joseph Bednash
(74) *Attorney, Agent, or Firm* — Jefferson IP Law, LLP

(57) ABSTRACT

A system and a method that reports capability information regarding a dual mode User Equipment (UE) are provided. The UE supports Frequency Division Duplex (FDD) and Time Division Duplex (TDD). The UE capability transmitting method includes receiving a message requesting UE capability information from an evolved Node B (eNB), generating first capability information and second capability information according to the UE capability information requesting message, and transmitting UE capability information including the first and second capability information to the eNB. The first capability information comprises FDD (Continued)

capability information applicable to an FDD mode or TDD capability information applicable to a TDD mode. The second capability information comprises capability information applicable to both the FDD mode and the TDD mode. The system and method can allow a dual mode UE to efficiently report its capability information.

12 Claims, 9 Drawing Sheets

Related U.S. Application Data

(60) Provisional application No. 61/591,385, filed on Jan. 27, 2012, provisional application No. 61/552,114, filed on Oct. 27, 2011, provisional application No. 61/531,185, filed on Sep. 6, 2011, provisional application No. 61/521,910, filed on Aug. 10, 2011, provisional application No. 61/524,000, filed on Aug. 16, 2011.

(51) Int. Cl.
*H04L 12/26* (2006.01)
*H04W 88/06* (2009.01)

(56) References Cited

U.S. PATENT DOCUMENTS

| | | |
|---|---|---|
| 2010/0041384 A1 | 2/2010 | Kazmi |
| 2010/0317356 A1 | 12/2010 | Roessel et al. |
| 2012/0218922 A1* | 8/2012 | Klingenbrunn ....... H04L 5/0053 370/280 |
| 2013/0322302 A1 | 12/2013 | Gholmieh et al. |

FOREIGN PATENT DOCUMENTS

| | | |
|---|---|---|
| CN | 102025409 A | 4/2011 |
| EP | 1 597 842 A | 11/2005 |

OTHER PUBLICATIONS

Qualcomm Incorporated, Separate UE capability for FDD and TDD, 3GPP TSG RAN WG2 #74, R2-113059, May 9-13, 2011.
Qualcomm Incorporated, UE capability for FDD and TDD, 3GPP TSG RAN WG2 #73bis, R2-111868, Apr. 11-15, 2011.
Qualcomm Incorporated, Introduction of UE capability for handover between FDD and TDD, 3GPP TSG RAN WG2 #74, R2-113056, May 9-13, 2011.
SAMSUNG; Discussion on FGI bit handling for FDD/TDD dual mode UE; 3GPP TSG-RAN2 #75 meeting, Aug. 22-26, 2011 (electronically published Aug. 16, 2011).
3GPP; 3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331; V10.2.0; Jun. 24, 2011.
LG Electronics Inc; FGI Bit 25; 3GPP TSG-RAN WG2 #74; R2-113277; Barcelona, Spain; May 9-14, 2011.
3GPP TSG-RAN WG2 #75, R2-114299, "Multiple frequency band indicators per cell"; Athens, Greece; Aug. 16, 2011.
R4-114382 TR 37.806 v1.1.0 change bars; Valbone, France; Aug. 17, 2011.

* cited by examiner

METHOD FOR REPORTING CAPABILITY INFORMATION AND DUAL MODE USER EQUIPMENT ADAPTED THERETO

CROSS-REFERENCE TO RELATED APPLICATIONS

This application is a continuation application of prior application Ser. No. 13/571,735, filed on Aug. 10, 2012, which claimed the benefit under 35 U.S.C. §119(e) of U.S. Provisional Application No. 61/521,910, filed on Aug. 10, 2011, U.S. Provisional Application No. 61/524,000, filed on Aug. 16, 2011, U.S. Provisional Application No. 61/531,185, filed on Sep. 6, 2011, U.S. Provisional Application No. 61/552,114, filed on Oct. 27, 2011, U.S. Provisional Application No. 61/591,385, filed on Jan. 27, 2012, and under 35 U.S.C. §119(a) of a Korean patent application filed on Aug. 6, 2012 in the Korean Intellectual Property Office and assigned Serial No. 10-2012-0085793, the entire disclosure of each of which is hereby incorporated by reference.

BACKGROUND OF THE INVENTION

1. Field of the Invention

The present invention relates to dual mode communication. More particularly, the present invention relates to an apparatus and method that allows a dual mode User Equipment (UE) to efficiently report its capability information.

2. Description of the Related Art

Mobile communication systems have been developed to provide users with communication services while they are moving. With the rapid development of communication technology, mobile communication systems can provide high speed data communication services as well as voice communication.

A Long Term Evolution (LTE) system, which is a next generation mobile communication system, is standardized in the 3rd Generation Partnership Project (3GPP). The LTE system implements high speed packet based communication at a data transfer rate of up to 100 Mbps, which is higher than the current data transfer rate.

In recent years, the LTE communication system has been combined with other technologies to enhance the transfer rate, and this is called Long Term Evolution-Advanced (LTE-A) system. A technology introduced by the LTE system is carrier aggregation. Carrier aggregation enables one UE to use a number of forward carriers and a number of reverse carriers, compared with the technology of the related are in which a UE performs data transmission/reception only using one forward carrier and one reverse carrier. To support carrier aggregation, a UE can be equipped with additional functions and parts, which are mandatory and optional, respectively.

When an evolved Node B (eNB) establishes a wireless channel with the UE, it needs to precisely detect the capability of the UE. To this end, a procedure has been defined in which the UE reports its capabilities to a network. However, the conventional capability information was designed for a single mode UE. Therefore, a system and method is required that allows a dual mode UE to efficiently report its capability information.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method that allows a dual mode User Equipment (UE) to efficiently report its capability information.

In accordance with an aspect of the invention, a method for transmitting, by a UE that supports Frequency Division Duplex (FDD) and Time Division Duplex (TDD), UE capability information to an evolved Node B (eNB), is provided. The method includes receiving a message requesting UE capability information from the eNB, generating first capability information and second capability information according to the UE capability information requesting message, and transmitting UE capability information including the first and second capability information to the eNB. The first capability information comprises FDD capability information applicable to an FDD mode or TDD capability information applicable to a TDD mode. The second capability information comprises capability information applicable to both the FDD mode and the TDD mode.

In accordance with another aspect of the invention, a UE that supports FDD and TDD is provided. The UE includes a transceiver for receiving a message requesting UE capability information from an eNB, and a controller for generating first capability information and second capability information according to the UE capability information requesting message. The transceiver transmits UE capability information including the first and second capability information to the eNB. The first capability information comprises FDD capability information applicable to an FDD mode or TDD capability information applicable to a TDD mode. The second capability information comprises capability information applicable to both the FDD mode and the TDD mode.

In accordance with another aspect of the present invention, a method for receiving, by an eNB, capability information regarding a UE is provided. The method includes transmitting a message requesting UE capability information to the UE, and receiving UE capability information including first capability information and second capability information, in response to the request message, from the UE. The first capability information comprises FDD capability information applicable to an FDD mode or TDD capability information applicable to a TDD mode. The second capability information comprises capability information applicable to both the FDD mode and the TDD mode.

In accordance with another aspect of the present invention, an eNB is provided. The eNB includes a transceiver for transmitting a message requesting UE capability information to a UE, and for receiving UE capability information including first capability information and second capability information, in response to the request message, from the UE. The first capability information comprises FDD capability information applicable to an FDD mode or DD capability information applicable to a TDD mode. The second capability information comprises capability information applicable to both the FDD mode and the TDD mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of well-known functions and structures incorporated herein may be omitted to avoid obscuring the subject matter of the invention. Exemplary embodiments of the invention are described below with reference to the accompanying drawings.

Figure 1:
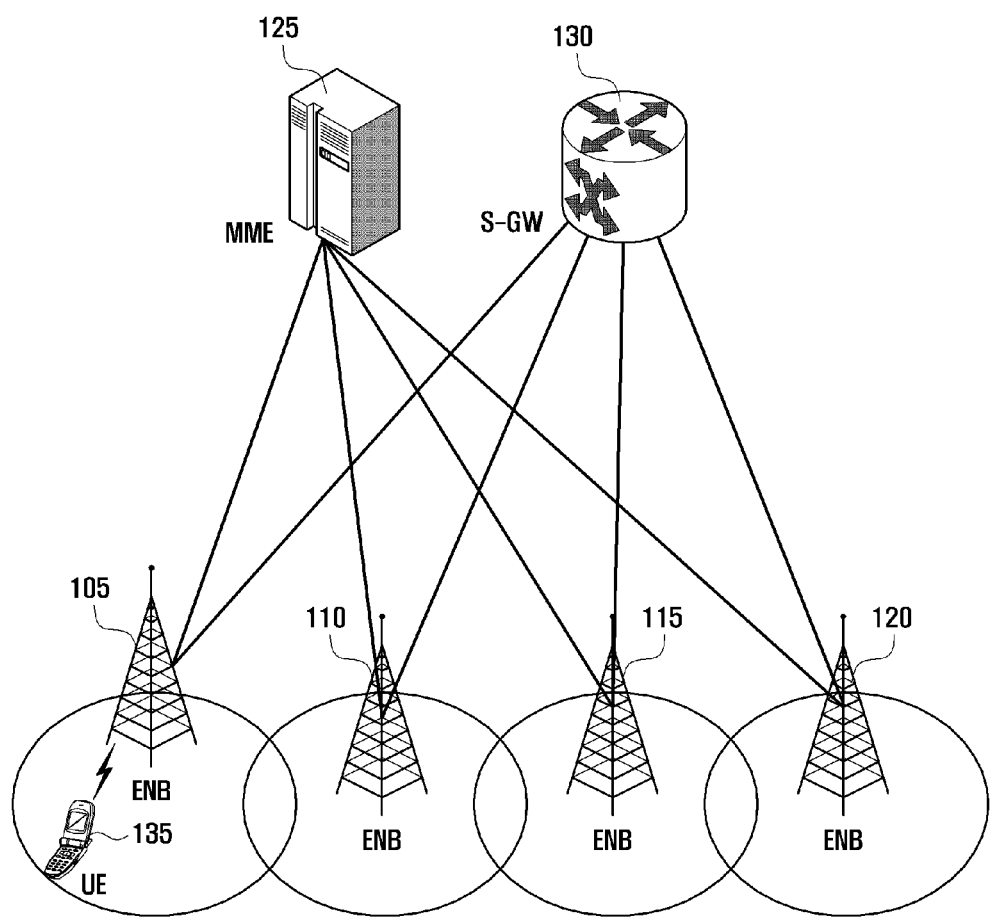
FIG. 1 illustrates a configuration of a Long Term Evolution (LTE) system according to an exemplary embodiment of the present invention.

FIG. 1 illustrates a configuration of a Long Term Evolution (LTE) system according to an exemplary embodiment of the present invention.

Referring to FIG. 1, the LTE system configures the wireless access network, including evolved Node Bs (eNBs) 105, 110, 115 and 120, a Mobility Management Entity (MME) 125, and a Serving-Gateway (S-GW) 130. A User Equipment (UE) 135 can access an external network via the eNBs 105, 110, 115 and 120 and the S-GW 130.

The eNBs 105, 110, 115 and 120 correspond to conventional Node Bs of the Universal Mobile Telecommunications System (UMTS) system and each eNB controls a number of cells. However, eNBs 105, 110, 115 or 120, any of which can provide service to the UE 135 via a wireless channel, perform more complicated functions than a conventional Node B. Since LTE systems provide real time services, such as Voice over Internet Protocol (VoIP), and all user traffic via a shared channel, they require devices that can collect state information, such as a UE buffer state, an available transmission power state, a channel state, etc., in order to schedule, for example, eNBs 105, 110, 115 and 120. In order to implement a transfer rate of 100 Mbps, an LTE system employs Orthogonal Frequency Division Multiplexing (OFDM) at a bandwidth of 20 MHz, as a wireless access technology. LTE systems also employ Adaptive Modulation & Coding (AMC) to determine a modulation scheme and a channel coding rate, meeting with the channel state of the UE. The S-GW 130 provides a data bearer and creates or removes data bearers according to the control of the MME 125. The MME 125 manages the mobility of a UE, controls a variety of functions, and connects to a number of eNBs.

Figure 2:
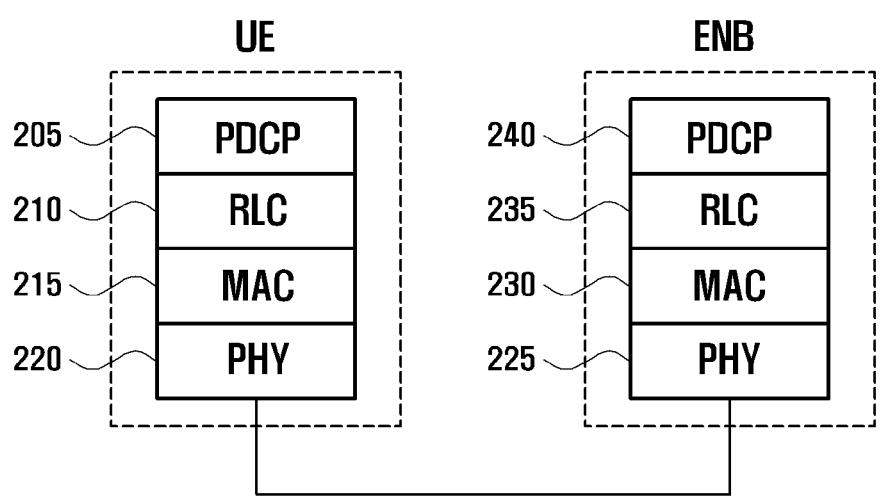
FIG. 2 illustrates a wireless protocol stack of an LTE system according to an exemplary embodiment of the present invention.

FIG. 2 illustrates a wireless protocol stack of an LTE system according to an exemplary embodiment of the present invention.

Referring to FIG. 2, a UE and an eNB respectively have Packet Data Convergence Protocol (PDCP) layers 205 and 240, Radio Link Control (RLC) layers 210 and 235, and Medium Access Control (MAC) layers 215 and 230. PDCP layers 205 and 240 compress/decompress an IP header. RLC layers 210 and 235 reconfigure a PDCP Packet Data Unit (PDU) in a proper size and perform an ARQ process. MAC layers 215 and 230 connect to a number of RLC layer devices configured in one UE. MAC layers 215 and 230 multiplex RLC PDUs to a MAC PDU, and de-multiplex RLC PDUs from a MAC PDU. PHYsical (PHY) layers 220 and 225 channel-code and modulate data from the upper layers, create OFDM symbols, and transmit them via a wireless channel. In addition, PHY layers 220 and 225 demodulate and channel-decode OFDM symbols received via a wireless channel, and transfer them to the upper layers.

Figure 3:
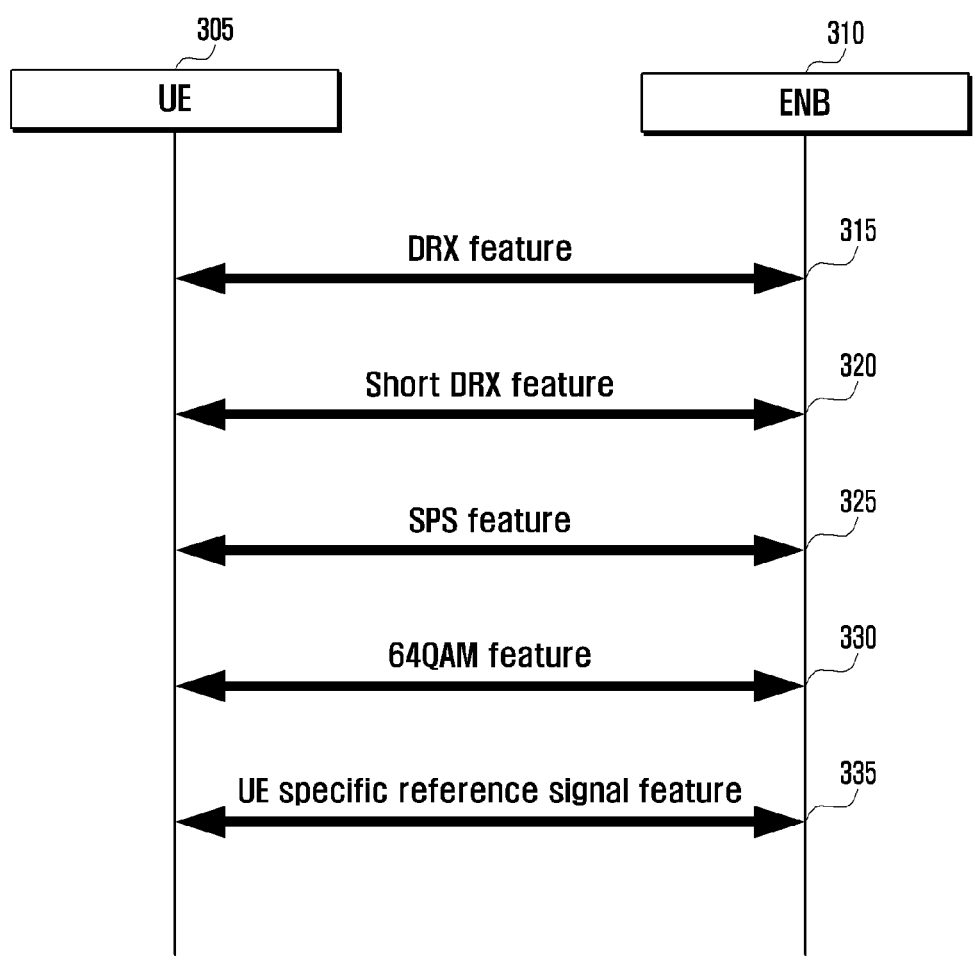
FIG. 3 illustrates a flowchart that describes a method for establishing a wireless connection between a User Equipment (UE) and an evolved Node B (eNB) according to an exemplary embodiment of the present invention.

FIG. 3 illustrates a flowchart that describes a method for establishing a wireless connection between a UE and an eNB according to an exemplary embodiment of the present invention.

Referring to FIG. 3, a UE 305 and an eNB 310 can set a variety of functions therebetween according to the capability of the UE 305 and the states of the eNB 310.

For example, the UE 305 and the eNB 310 can set a Discontinuous Reception (DRX) feature in order to allow the UE 305 to prevent excessive battery power from being consumed at step 315. The UE 305 and the eNB 310 can set a short DRX feature to maximally save the battery power in the UE 305 according to a traffic state at step 320. The UE 305 and the eNB 310 can set a Semi-Persistent Scheduling (SPS) feature to efficiently support a voice service at step 325. The UE 305 and the eNB 310 can set a 64 Quadrature Amplitude Modulation (64 QAM) feature to increase the transfer rate of the UE 305 close to the eNB 310 at step 330. The UE 305 and the eNB 310 can set a UE specific reference signal feature at step 335. Since none of steps 315 to 335 are mandatory, any or all of them may or may not be performed.

In order to set a specific feature to the UE 305 according to states, the eNB 310 needs to determine whether the UE 305 has implemented a corresponding feature and has been subjected to an Inter-Operability Test (IOT). More particularly, the eNB 310 must perform the determination if the UE 305 is a dual mode type of UE that supports both Frequency Division Duplex (FDD) and Time Division Duplex (TDD). A dual mode UE may support a feature in only one mode, or may perform IOT for a feature in only one mode. In that case, the UE 305 needs to report, to the eNB 310, a mode where a corresponding function for a feature can be executed or a mode where a feature has been subjected to an IOT. Exemplary embodiments of the present invention provide a system and method that can efficiently report information regarding the respective modes. A dual mode UE refers to a type of UE that can support two duplex modes, i.e., FDD and TDD. A duplex mode corresponds to a frequency band, one-to-one. Therefore, a dual mode UE can support at least one FDD band and at least one TDD band.

Figure 4:
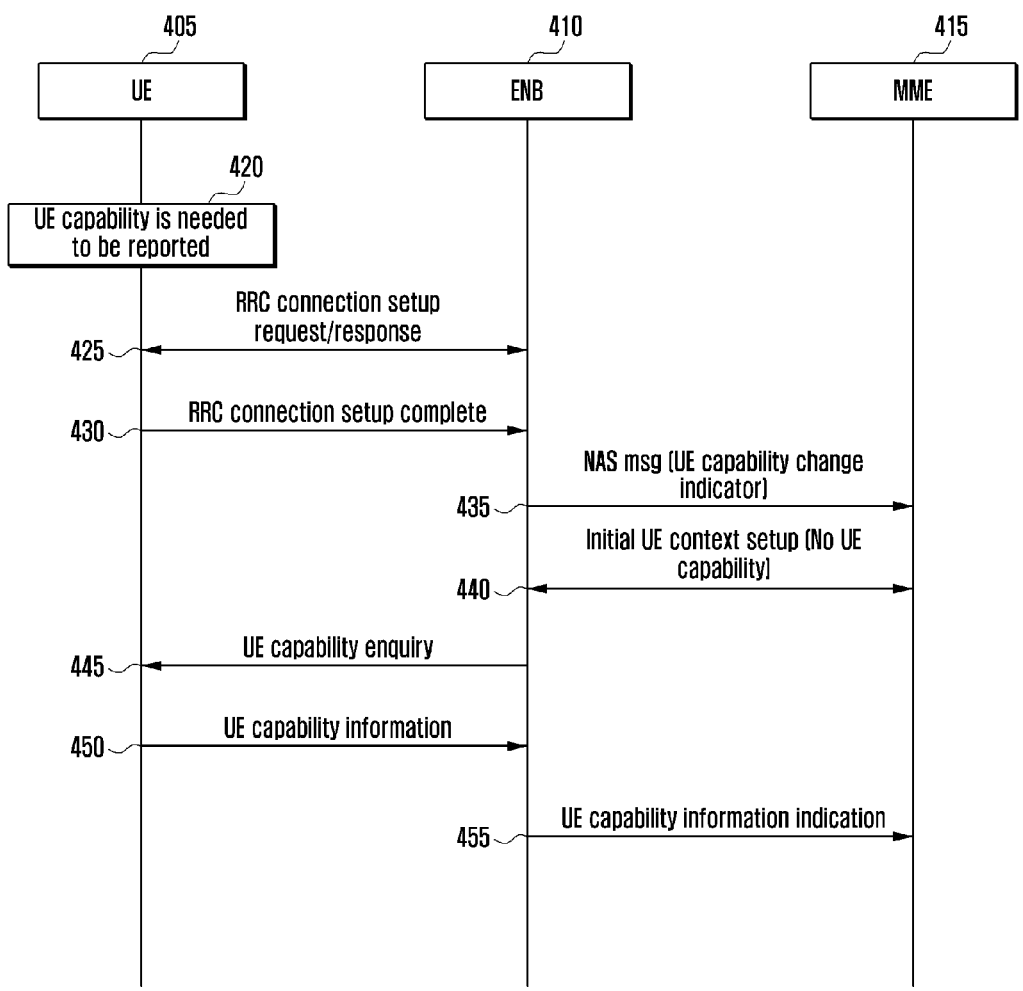
FIG. 4 illustrates a flowchart that describes a capability information reporting method according to an exemplary embodiment of the present invention.

FIG. 4 illustrates a flowchart that describes a capability information reporting method according to an exemplary embodiment of the present invention.

Referring to FIG. 4, an event occurs in a dual mode UE 405 such that the dual mode UE 405 needs to newly report its capabilities at step 420. An example of the event is a case where the UE 405 is turned on or the current UE capabilities differ from the previously reported UE capabilities. More particularly, if the UE 405 reports its capabilities while connecting to an FDD network and then moves the connection to a TDD network, or if the UE 405 reports its capabilities while connecting to a TDD network and then moves the connection to an FDD network, it needs to newly report its capabilities.

The UE 405 exchanges an RRC CONNECTION SETUP REQUEST message and an RRC CONNECTION SETUP message with an eNB 410 at step 425. The UE 405 and the eNB 410 establish an RRC connection therebetween to transmit control messages to each other. The RRC CONNECTION SETUP REQUEST message includes an identifier of the UE 405 and a cause for RRC connection setup. The RRC CONNECTION SETUP message includes Signaling Radio Bearer (SRB) setup information, MAC setup information, PHY setup information, etc., SRB refers to wireless bearer for serving an RRC control message.

The UE 405 transmits an RRC CONNECTION SETUP COMPLETE message to the eNB 410 at step 430. The RRC CONNECTION SETUP COMPLETE message includes a Non-Access-Stratum (NAS) message intended for an MME 415. The NAS message includes information indicating that the capabilities of the UE 405 have been altered. The capabilities of the UE 405 are stored in the MME 415. When an RRC connection is set up between the UE 405 and the eNB 410, the MME 415 transmits radio communication related capability of the UE 405 to the eNB 410. This prevents the UE 405 from reporting its capabilities to the eNB 410 each time that an RRC connection is setup therebetween. Therefore, after the UE 405 moves from an FDD network to a TDD network or from a TDD network to an FDD network, it can report the new UE capability information by transmitting information indicating that the UE capability has been altered to the corresponding network.

The eNB 410 transmits the NAS message included in the RRC CONNECTION SETUP COMPLETE message to the MME 415 at step 435. The NAS message refers to control messages exchanged between the UE 405 and the MME 415. When the UE 405 is turned on, it transmits an ATTACH REQUEST NAS message to the MME 415. If the UE 405 that has been turned on newly sets up an RRC connection, it transmits a SERVICE REQUEST NAS message to the MME 415. If the UE 405 moves to a new tracking area, it transmits a TRACKING AREA UPDATE NAS message to the MME 415. When the MME 415 receives NAS messages from the UE 405, it performs a corresponding operation according to the type of NAS message and information included therein.

If the MME 415 receives an NAS message including information indicating that the capability information of the UE 405 has been altered, the MME 415 performs an INITIAL CONTEXT SETUP process with respect to the eNB 410, in order to acquire the new capability information of the UE 405, at step 440. During the INITIAL CONTEXT SETUP process, the MME 415 transmits information, required to provide services to the UE 405, to the eNB 410. For example, the MME 415 may transmit, to the eNB 410, information related to security, Quality of Service (QoS), and the like. The MME 415 also transmits UE capability information related to radio communication to the eNB 410 during the INITIAL CONTEXT SETUP process. Since the MME 415 has recognized that the capability of the UE 405 has been altered at step 440, it does not transmit the UE capability information related to radio communication to the eNB 410. Therefore, the eNB 410 can start to acquire the UE capability information. That is, when the eNB 410 may not receive the UE capability information during the INITIAL CONTEXT SETUP process, it can acquire the UE capability information via the following steps 445, 450, and 455. Alternatively, the eNB 410 may perform a process for acquiring UE capability information via preset conditions, e.g., after a preset period of time has elapsed, according to an additional request, etc.

The eNB 410 transmits a control UE capability enquiry message to the UE 405, which instructs the UE 405 to report its capabilities, at step 445. That is, the eNB 410 instructs the UE 405 to report its capability related to a Radio Access Technology (RAT) via the UE capability enquiry message. Since the eNB 410 requires UE capability related to Evolved UMTS Terrestrial Radio Access Network (E-UTRA) from the UE 405 at step 445, the UE capability enquiry message may include information that instructs the UE 405 to report E-UTRA capability.

The UE 405 transmits its capabilities to the eNB 410 at step 450. The UE capability information message may include a preset format of UE capability information as shown in Table 1.

TABLE 1

```
UE-EUTRA-Capability ::= SEQUENCE {
    accessStratumRelease    AccessStratumRelease,
    ue-Category             INTEGER (1..5),
```

TABLE 1-continued

```
pdcp-Parameters          PDCP-Parameters,
phyLayerParameters           PhyLayerParameters,
rf-Parameters            RF-Parameters,
measParameters           MeasParameters,
featureGroupIndicators   BIT STRING (SIZE (32))          OPTIONAL,
interRAT-Parameters          SEQUENCE {
   utraFDD               IRAT-ParametersUTRA-FDD             OPTIONAL,
   utraTDD128               IRAT-ParametersUTRA-TDD128        OPTIONAL,
   utraTDD384               IRAT-ParametersUTRA-TDD384        OPTIONAL,
   utraTDD768               IRAT-ParametersUTRA-TDD768        OPTIONAL,
   geran                    IRAT-ParametersGERAN              OPTIONAL,
   cdma2000-HRPD            IRAT-ParametersCDMA2000-HRPD         OPTIONAL,
   cdma2000-1xRTT              IRAT-ParametersCDMA2000-1XRTT
OPTIONAL
   },
   nonCriticalExtension    UE-EUTRA-Capability-v920-IEs        OPTIONAL
}
```

More detailed information regarding the entities, described in Table 1, may be acquired referring to 3GPP Technical Specification (TS) 36.331. For example, rf-Parameter includes information regarding frequency bands supported by a UE. The frequency bands are defined as shown in Table 2.

TABLE 2

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| ... | | | |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

The UE 405 reports the number of frequency bands that it supports, via rf-Parameters. The frequency bands are classified into an FDD band and a TDD band. If the UE 405 supports only an FDD band, it is a UE that operates in an FDD band. Likewise, if the UE 405 supports only a TDD band, it is a UE that operates in a TDD band. If the UE 405 supports both the FDD and the TDD bands, it is a dual mode UE that operates in both the FDD bands and the TDD bands.

The featureGroupIndicators refers to information showing whether the UE 405 is subjected to an IOT with respect to a feature group. The featureGroupIndicators is described in more detail as shown in Table 3. The features included in featureGroupIndicators refer to mandatory features that the UE must implement. For example, if the UE sets bit 3 of Feature Group Indicator (FGI) to '1,' this means that it has implemented 5 bit RLC Unacknowledge Mode (UM) Sequence Number (SN) and 7 bit PDCP SN and has also been subjected to the IOT.

TABLE 3

| Index of indicator (bit number) | Definition (description of the supported functionality, if indicator set to one) |
|---|---|
| 1 (leftmost bit) | Intra-subframe frequency hopping for PUSCH scheduled by UL grant DCI format 3a (TPC commands for PUCCH and PUSCH with single bit power adjustments) PDSCH transmission mode 5 Aperiodic CQI/PMI/RI reporting on PUSCH: Mode 2-0 - UE selected subband CQI without PMI Aperiodic CQI/PMI/RI reporting on PUSCH: Mode 2-2 - UE selected subband CQI with multiple PMI |

TABLE 3-continued

| Index of indicator (bit number) | Definition (description of the supported functionality, if indicator set to one) |
|---|---|
| 2 | Simultaneous CQI and ACK/NACK on PUCCH, i.e. PUCCH format 2a and 2b
Absolute TPC command for PUSCH
Resource allocation type 1 for PDSCH
Periodic CQI/PMI/RI reporting on PUCCH: Mode 2-0 - UE selected subband CQI without PMI
Periodic CQI/PMI/RI reporting on PUCCH: Mode 2-1 - UE selected subband CQI with single PMI |
| 3 | 5 bit RLC UM SN
7 bit PDCP SN |
| 4 | Short DRX cycle |
| 5 | Long DRX cycle
DRX command MAC control element |
| 6 | Prioritized bit rate |
| 7 | RLC UM |
| 8 | EUTRA RRC_CONNECTED to UTRA CELL_DCH PS handover |
| 9 | EUTRA RRC_CONNECTED to GERAN GSM_Dedicated handover |
| 10 | EUTRA RRC_CONNECTED to GERAN (Packet_) Idle by Cell Change Order
EUTRA RRC_CONNECTED to GERAN (Packet_) Idle by Cell Change Order with NACC (Network Assisted Cell Change) |
| 11 | EUTRA RRC_CONNECTED to CDMA2000 1xRTT CS Active handover |
| 12 | EUTRA RRC_CONNECTED to CDMA2000 HRPD Active handover |
| 13 | Inter-frequency handover (within FDD or TDD) |
| 14 | Measurement reporting event: Event A4 - Neighbor > threshold
Measurement reporting event: Event A5 - Serving < threshold1 & Neighbor > threshold2 |
| 15 | Measurement reporting event: Event B1 - Neighbor > threshold |
| 16 | non-ANR related intra-frequency periodical measurement reporting;
non-ANR related inter-frequency periodical measurement reporting, if the UE has set bit number 25 to 1; and
non-ANR related inter-RAT periodical measurement reporting for UTRAN, GERAN, 1xRTT or HRPD, if the UE has set bit number 22, 23, 24 or 26 to 1, respectively. |
| 17 | Periodical measurement reporting for SON/ANR
ANR related intra-frequency measurement reporting events |
| 18 | ANR related inter-frequency measurement reporting events |
| 19 | ANR related inter-RAT measurement reporting events |
| 20 | If bit number 7 is set to 0:
SRB1 and SRB2 for DCCH + 8x AM DRB
If bit number 7 is set to 1:
SRB1 and SRB2 for DCCH + 8x AM DRB
SRB1 and SRB2 for DCCH + 5x AM DRB + 3x UM DRB |
| 21 | Predefined intra- and inter-subframe frequency hopping for PUSCH with N_sb > 1
Predefined inter-subframe frequency hopping for PUSCH with N_sb > 1 |
| 22 | UTRAN measurements, reporting and measurement reporting event B2 in E-UTRA connected mode |
| 23 | GERAN measurements, reporting and measurement reporting event B2 in E-UTRA connected mode |
| 24 | 1xRTT measurements, reporting and measurement reporting event B2 in E-UTRA connected mode |
| 25 | Inter-frequency measurements and reporting in E-UTRA connected mode
NOTE: The UE setting this bit to 1 and indicating support for FDD and TDD frequency bands in the UE capability signaling implements and is tested for FDD measurements while the UE is in TDD, and for TDD measurements while the UE is in FDD. |
| 26 | HRPD measurements, reporting and measurement reporting event B2 in E-UTRA connected mode |
| 27 | EUTRA RRC_CONNECTED to UTRA CELL_DCH CS handover |
| 28 | TTI bundling |
| 29 | Semi-Persistent Scheduling |
| 30 | Handover between FDD and TDD |
| 31 | Undefined |
| 32 | Undefined |

If the dual mode UE supports a feature group in FDD and TDD modes and has been subjected to an IOT for the feature group in the modes, it can set FGI for a corresponding feature group to '1.' However, it frequently occurs that, although the dual mode UE has been subjected to an IOT in an FDD mode, it may not have been subjected to the IOT in a TDD mode or vice versa. In that case, the UE 405 cannot determine how to set up FGI for a corresponding feature group. In order to address the problem, the UE 405 reports two sets of FGIs (sets of FGI bits as described in Table 3). One set of FGI indicates whether the UE 405 has been subjected to an IOT in an FDD mode (hereinafter called an FDD FGI set), and the other set of FGI indicates whether the UE 405 has been subjected to an IOT in a TDD mode (hereinafter called a TDD FGI set).

When the UE 405 transmits two sets of FGIs via a network, if the eNB 410 and the MME 415 are adapted to a system of the previous release version, they cannot detect part of the received information. If the UE 405 is aware of the release version of the eNB 410 or the network, it can transmit FGI corresponding to the release version. However, since the current system does not provide information to infer the release version of the eNB 410 or the network, sets of FGIs must be defined considering that the eNB 410 may not detect information in a new format.

In order to address the problems described above, the field that includes information regarding a set of FGI is determined, referring to a mode of a network (or the eNB 410) to which the UE 405 has established a connection. That is, the UE 405 includes one FGI set in a legacy field (or a default field) and the other FGI set in an extension field. In that case, although a network does not detect the extension field, it can detect FGI in a legacy field. Therefore, a corresponding operation can be executed based on the detected information. If a duplex mode of a network where a connection has been currently established differs from that of an FGI set included in a legacy field, the eNB 410 may mistakenly judge the capability of the UE 405. To address this problem, the UE 405 refers to a mode of a network where a connection has been established at a time point when it reports the capability information, and includes an FGI set of a corresponding mode in a legacy field and an FGI set of the other mode in an extension field. Table 4 describes a conventional Information Entity (IE) for FGI and an IE for FGI of an extension field. It should be understood that Table 4 shows one of the exemplary embodiments.

Figure 5:
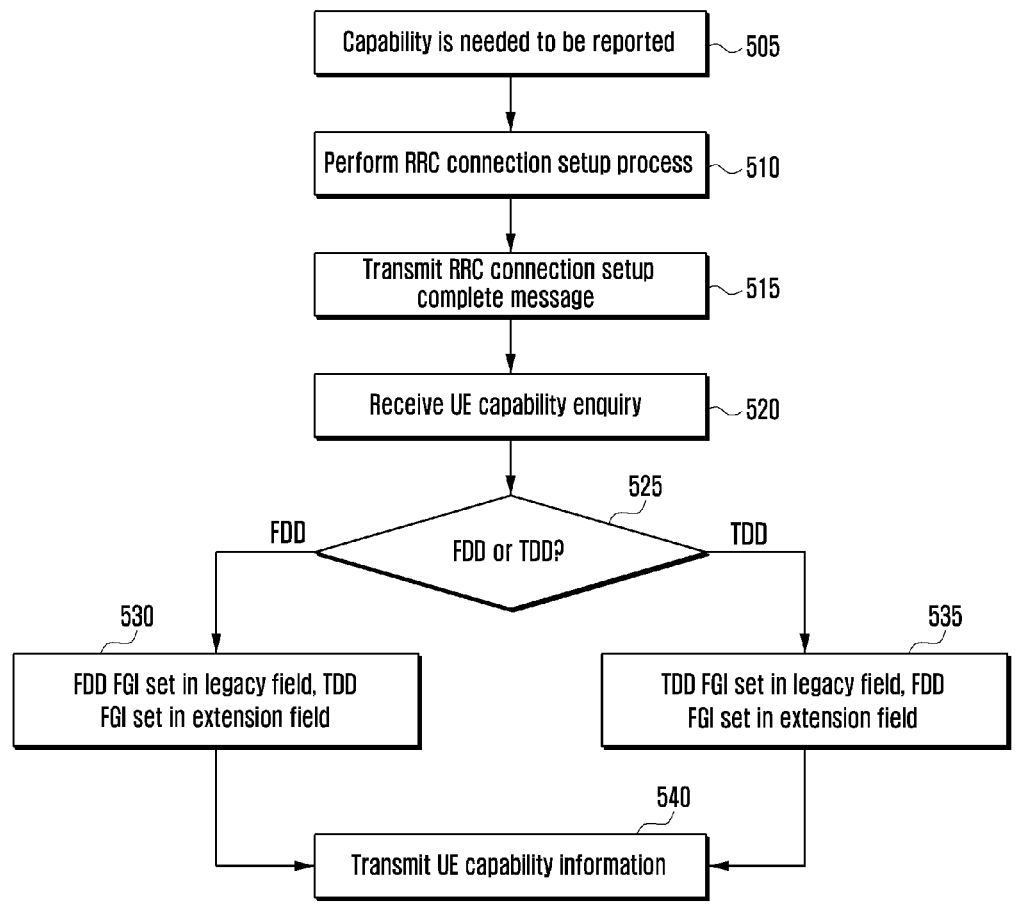
FIG. 5 illustrates a flowchart that describes a method for transmitting capability information by a UE, according to a first exemplary embodiment of the present invention.

FIG. 5 illustrates a flowchart that describes a method for transmitting capability information by a UE, according to a first exemplary embodiment of the invention.

Referring to FIG. 5, an event occurs in a dual mode UE 405 such that it needs to newly report its capability information to an eNB 410 at step 505. The UE 405 performs an RRC CONNECTION SETUP process with respect to the eNB 410 at step 510. When the UE 405 establishes an RRC connection with the eNB 410, it generates an RRC CONNECTION SETUP COMPLETE message and transmits it to the eNB 410 at step 515. The RRC CONNECTION SETUP COMPLETE message may include NAS messages, such as ATTACH REQUEST, Tracking Area Update (TAU), SERVICE REQUEST, and the like. The UE 405 may include information indicating that the UE radio capability has been altered in the NAS message.

After transmitting the RRC CONNECTION SETUP COMPLETE message to the eNB 410, the UE 405 may execute corresponding functions at step 520. In order to acquire new UE capability information regarding the UE 405, the eNB 410 may transmit a UE capability enquiry message to the UE 405 as described above, referring to FIG.

TABLE 4

```
UE-EUTRA-Capability ::=   SEQUENCE {
    accessStratumRelease          AccessStratumRelease,
    ue-Category                   INTEGER (1..5),
    pdcp-Parameters               PDCP-Parameters,
    phyLayerParameters            PhyLayerParameters,
    rf-Parameters                 RF-Parameters,
    measParameters                MeasParameters,
    featureGroupIndicators        BIT STRING (SIZE (32)) == featureGroupIndicator, applied to
the existing IE and the current duplex mode ==
    interRAT-Parameters           SEQUENCE {
       utraFDD                    IRAT-ParametersUTRA-FDD
OPTIONAL,
       utraTDD128                 IRAT-ParametersUTRA-TDD128           OPTIONAL,
       utraTDD384                 IRAT-ParametersUTRA-TDD384           OPTIONAL,
       utraTDD768                 IRAT-ParametersUTRA-TDD768           OPTIONAL,
       geran                      IRAT-ParametersGERAN                 OPTIONAL,
       cdma2000-HRPD              IRAT-ParametersCDMA2000-HRPD
OPTIONAL,
       cdma2000-1xRTT             IRAT-ParametersCDMA2000-1XRTT
OPTIONAL
    },
    nonCriticalExtension          UE-EUTRA-Capability-v920-IEs   OPTIONAL
}
UE-EUTRA-Capability-v11xy-IEs ::= SEQUENCE {
    featureGroupIndicators        BIT STRING (SIZE (32)) == featureGroupIndicator,
applied to newly extended IE and a duplex mode that differs from the current duplex mode ==
}
```

If the dual mode UE 405 has set up a connection with an FDD network (i.e., if the UE 405 is connected to the eNB 410 operating in an FDD band), it may include an FDD FGI set in a legacy field and a TDD FGI set in an extension field. Alternatively, if the dual mode UE 405 has set up a connection with a TDD network (i.e., if the UE 405 is connected to the eNB 410 operating in a TDD band), it may include a TDD FGI set in a legacy field and an FDD FGI set in an extension field.

The eNB 410 includes the UE capability information, received at step 450, in a UE CAPABILITY INFO INDICATION control message and transmits the message to the MME 415 at step 455. The MME 415 stores the received UE capability information and uses it during the INITIAL CONTEXT SETUP process. The eNB 410 can determine setting information that will be applied to the UE 405, referring to the UE capability information transmitted from the UE 405.

4. The message may include information that instructs the UE 405 to report E-UTRA capability.

When the UE 405 receives the message from the eNB 410 at step 520, it determines whether the mode of the current network is an FDD or TDD mode at step 525. That is, the UE 405 determines whether the operating band of the current cell is an FDD or TDD band. Alternatively, the UE 405 determines whether its current operating band is an FDD or TDD band. Since the current operating band of the UE 405 always matches the operating band of the current cell, the two determining processes are substantially identical to each other. Alternatively, the UE 405 may have previously determined the mode of the current network at step 505. That is, the UE 405 may execute the processes following step 525, based on the mode of the network at a time point that it needs to report the capability information.

If it is determined that the mode of the current network is an FDD mode at step 525, the UE 405 includes an FDD FGI set (i.e., information showing whether an IOT test has been performed in an FDD mode) in a legacy field (which can be understood by a conventional network), and a TDD FGI set (i.e., information showing whether an IOT test has been performed in a TDD mode) in an extension field (which can be understood by a network of a new release version, e.g., Release 10 or Release 11) at step 530. The UE 405 may perform the processes, taking into consideration whether an FDD FGI set and a TDD FGI set are identical to each other. That is, if the FDD FGI set and the TDD FGI set differ from each other, the UE 405 reports them to the eNB 410. If the FDD FGI set and the TDD FGI set are identical to each other, the UE 405 reports one of them to the eNB 410. Alternatively, the UE 405 may perform the processes, taking into consideration whether the FDD capability information is identical to the TDD capability information. For example, if the FDD capability information (e.g., the FDD FGI set) differs from the TDD capability information (e.g., the TDD FGI set), the UE 405 reports the two sets to the eNB 410. If the FDD capability information (e.g., the FDD FGI set) is identical to the TDD capability information (e.g., the TDD FGI set), the UE 405 may not include an extension field. Therefore, if the eNB 410 receives capability information including one FGI set, it concludes that the received capability information can be applied to both TDD and FDD.

On the contrary, if it is determined that the mode of the current network is a TDD mode at step 525, the UE 405 includes a TDD FGI set in a legacy field (which can be understood by a conventional network), and an FDD FGI set (i.e., information showing whether an IOT test has been performed in an FDD mode) in an extension field (which can be understood by a network of a new release version, e.g., Release 10 or Release 11) at step 535. The UE 405 may perform the processes, taking into consideration whether an FDD FGI set and a TDD FGI set are identical to each other. That is, if the FDD FGI set and the TDD FGI set differ from each other, the UE 405 reports them to the eNB 410. If the FDD FGI set and the TDD FGI set are identical to each other, the UE 405 reports one of them to the eNB 410. Alternatively, the UE 405 may perform the processes, taking into consideration whether the FDD capability information is identical to the TDD capability information. For example, if the FDD capability information (e.g., the FDD FGI set) differs from the TDD capability information (e.g., the TDD FGI set), the UE 405 reports the two sets to the eNB 410. If the FDD capability information (e.g., the FDD FGI set) is identical to the TDD capability information (e.g., the TDD FGI set), the UE 405 may not include an extension field. Therefore, if the eNB 410 receives capability information including one FGI set, it concludes that the received capability information can be applied to TDD and FDD.

The UE 405 transmits the UE capability information, including information generated at steps 530 or 535, to the eNB 410 at step 540.

The UE 405 can report the FGI sets and the other information. For example, the UE 405 may report information related to other capabilities that depend on whether an IOT test is performed or whether it can be supported (e.g., a feature indicating whether it can be supported via phyLayerParameters or interRAT-Parameters). The UE 405 may also report information related to the other capabilities, information regarding FDD, and information regarding TDD. During this process, the UE 405 includes capability information, supported in a mode of the current network, in a legacy related-field, and also capability information, supported in a mode other than the mode of the current network, in an extension field, and then reports them.

Figure 6:
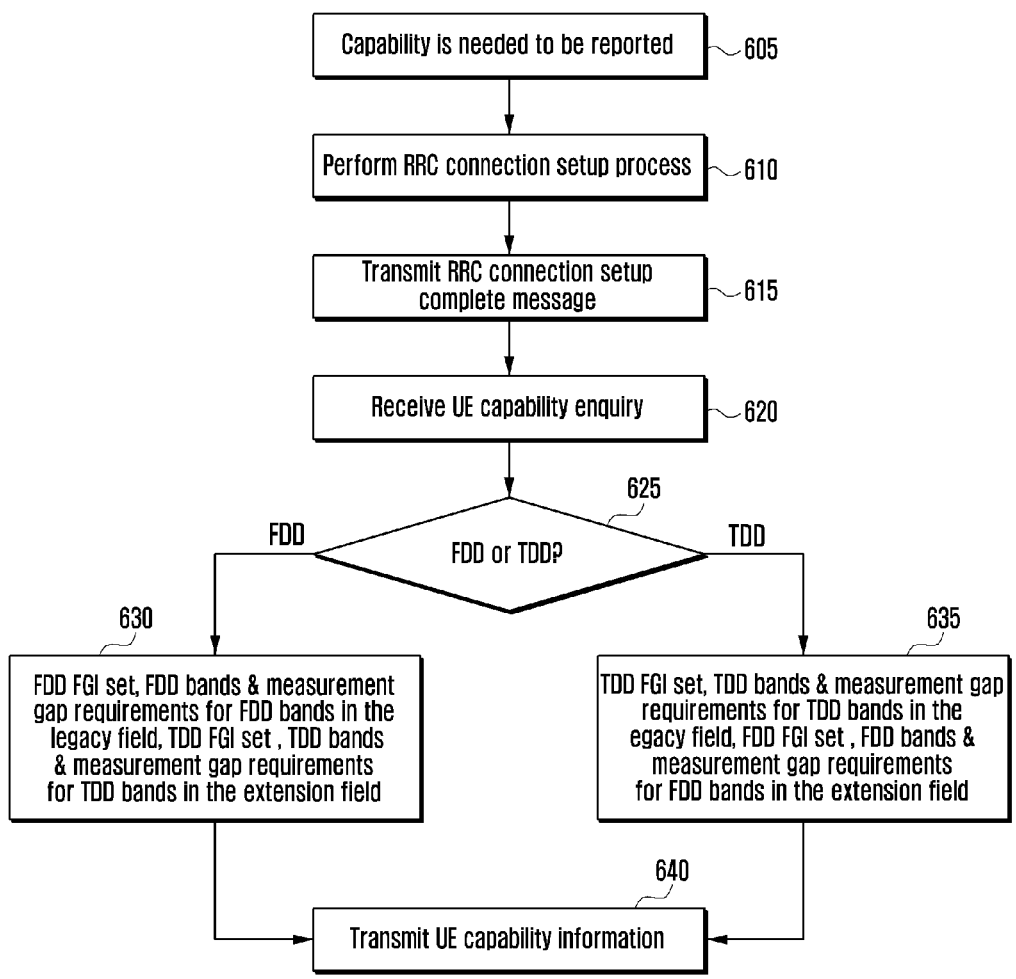
FIG. 6 illustrates a flowchart that describes a method for reporting capability information by a UE, according to a second exemplary embodiment of the present invention.

FIG. 6 illustrates a flowchart that describes a method for reporting capability information by a UE according to a second exemplary embodiment of the present invention.

A conventional UE reports all frequency bands that it supports via rf-Parameters, and also reports a measurement gap requirement for respective frequency bands via measParameters.

In the second exemplary embodiment of the invention, the UE 405 determines information to be included in rf-Parmeters and measParameters, considering a mode of a current serving network. If the UE 405 is connected to an FDD network, it reports FDD bands and the measurement gap requirement for the FDD bands, via a legacy field, e.g., rf-Parameters and measParameters. The UE 405 reports information regarding a mode, different from that of a current serving network, via an extension field (e.g., rf-Parameters and measParameters defined as a lower field of a UE-EUTRA-Capability-v11xy-IEs field).

As such, since a UE according to exemplary embodiments of the present invention operates in an FDD band and a TDD band separately, it can communicate with an eNB of the previous release without malfunction. That is, if an FDD band and a TDD band were reported to a legacy field but an FGI reports information regarding only one of the two bands, an eNB of the previous release may make a mistake in determining a feature group with respect to the mobility. For example, FGI 25 is related to inter-frequency for E-UTRA bands. Although the UE 405 has set FGI 25 of featureGroupIndicators of UE-EUTRA-Capability as a legacy related-field to '1' in order to indicate that it has been subjected to an IOT for inter-frequency measurement with respect to the FDD bands, if the FDD bands and TDD bands are reported via rf-Parameters of the legacy related-field, the eNB of the previous release may mistakenly determine that the UE 405 has been subjected to an IOT for inter-frequency measurement with respect to all bands including FDD bands and TDD bands. Therefore, exemplary embodiments of the invention report bands with respect to modes.

Referring to FIG. 6, an event occurs in a dual mode UE 405 such that it needs to newly report its capability information at step 605. The UE 405 performs an RRC CONNECTION SETUP process with respect to the eNB at step 610. When the UE 405 establishes an RRC connection with the eNB, it generates an RRC CONNECTION SETUP COMPLETE message and transmits the message to the eNB 410 at step 615. The message may include NAS messages, such as ATTACH REQUEST, Tracking Area Update (TAU), SERVICE REQUEST, and the like. The UE 405 may include information indicating that the UE radio capability has been altered in the NAS message.

After transmitting an RRC CONNECTION SETUP COMPLETE message to the eNB 410, the UE 405 may execute corresponding functions at step 620. In order to acquire new UE capability information regarding the UE 405, the eNB 410 may transmit a UE capability enquiry message to the UE 405 as described above, referring to FIG. 4. The message may include information that instructs the UE 405 to report E-UTRA capability.

When the UE 405 receives the message from the eNB 410 at step 620, it determines whether the mode of the current network is an FDD or TDD mode at step 625. That is, the UE 405 determines whether the operating band of the current cell is an FDD or TDD band. Alternatively, the UE 405 determines whether its current operating band is an FDD or TDD band. Since the current operating band of the UE 405 always matches the operating band of the current cell, the two determining processes are substantially identical to each other. Alternatively, the UE 405 may have previously determined the mode of the current network at step 605. That is, the UE 405 may execute the processes following step 525, based on the mode of the network at a time point that it needs to report the capability information.

If it is determined that the mode of the current network is an FDD mode at step 625, the UE 405 includes an FDD FGI set, FDD bands that it supports, a measurement gap requirement for the FDD bands, etc., in a legacy field (which can be understood by a conventional network), and also a TDD FGI set (i.e., information showing whether an IOT test has been performed in a TDD mode), TDD bands that it supports, a measurement gap requirement for the TDD bands, etc., in an extension field at step 630.

Table 5 describes an example of an IE that can be used at step 630.

TABLE 5

| | | |
|---|---|---|
| UE-EUTRA-Capability ::= | SEQUENCE { | |
| accessStratumRelease | AccessStratumRelease, | |
| ue-Category | INTEGER (1..5), | |
| pdcp-Parameters | PDCP-Parameters, | |
| phyLayerParameters | PhyLayerParameters, | |
| rf-Parameters | RF-Parameters, | == Only FDD bands are included == |
| measParameters | MeasParameters, | == measurement gap requirement for FDD bands == |
| featureGroupIndicators | BIT STRING (SIZE (32)) | == featureGroupIndicator of FDD == |
| interRAT-Parameters | SEQUENCE { | |
| utraFDD | IRAT-ParametersUTRA-FDD | OPTIONAL, |
| utraTDD128 | IRAT-ParametersUTRA-TDD128 OPTIONAL, | |
| utraTDD384 | IRAT-ParametersUTRA-TDD384 OPTIONAL, | |
| utraTDD768 | IRAT-ParametersUTRA-TDD768 OPTIONAL, | |
| geran | IRAT-ParametersGERAN | OPTIONAL, |
| cdma2000-HRPD | IRAT-ParametersCDMA2000-HRPD OPTIONAL, | |
| cdma2000-1xRTT | IRAT-ParametersCDMA2000-1XRTT OPTIONAL | |
| }, | | |
| nonCriticalExtension | UE-EUTRA-Capability-v920-IEs OPTIONAL | |
| } | | |
| UE-EUTRA-Capability-v11xy-IEs ::= | SEQUENCE { | |
| rf-Parameters == | RF-Parameters, | ==Only TDD bands are included == |
| measParameters | MeasParameters, | ==measurement gap requirement for TDD bands == |
| featureGroupIndicators == | BIT STRING (SIZE (32)) | ==featureGroupIndicator of TDD |
| } | | |

Mobility-related bits of the FGI bits, e.g., FGI 8, 9, 10, 11, 25, etc., have different meanings according to positions where featureGroupIndicators are stored and according to information included in the stored rf-Parameters, as follows.

Mobility-related FGIs of the featureGroupIndicators in a legacy field indicate the requirement of an IOT with respect to only the bands included in the rf-Parameters of a legacy field.

Mobility-related FGIs of the featureGroupIndicators in an extension field report the requirement of an IOT with respect to items that were not reported via FGI of a legacy related-field, considering bands included in the rf-Parameters of an extension field and bands included in the rf-Parameters of a legacy related-field.

For example, if the UE 405 locates, in a legacy field, an rf-Parameter including an FDD band (or a TDD band at step 635) and an FGI related to an FDD (or TDD) mode, and also, in an extension field, an rf-Parameter including a TDD band (or an FDD band) and an FGI related to a TDD (or an FDD at step 635) mode, a mobility-related FGI bit in a legacy field, e.g., FGI 25, indicates the requirement of an IOT test for the following case.

the requirement of an IOT test for inter-frequency measurement with respect to an FDD (or TDD at step 635) band in an FDD (or TDD at step 635) band.

a mobility-related FGI bit in an extension field, e.g., FGI 25, indicates the requirement of an IOT test for the following cases (i.e., of the four total cases, reports are made regarding three cases except for one case that was reported via a legacy related-field).

the requirement of an IOT test as to whether inter-frequency measurement is performed with respect to a TDD (or FDD at step 635) band in an FDD (or TDD at step 635) band.

the requirement of an IOT test as to whether inter-frequency measurement is performed with respect to a TDD (or FDD at step 635) band in a TDD (or FDD at step 635) band.

the requirement of an IOT test as to whether inter-frequency measurement is performed with respect to an FDD (or TDD at step 635) band in a TDD (or FDD at step 635) band.

Meanwhile, if it is determined that the mode of the current network is a TDD mode at step 625, the UE 405 includes a TDD FGI set (i.e., information showing whether an IOT test has been performed in a TDD mode), TDD bands that it supports, a measurement gap requirement for the TDD bands, etc., in a legacy field (which can be understood by a conventional network), and also an FDD FGI set (i.e., information showing whether an IOT test has been performed in an FDD mode), FDD bands that it supports, measurement gap requirement for the FDD bands, etc., in an extension field at step 635.

The UE 405 transmits the UE capability information, including information generated at steps 630 or 635, to the eNB 410 at step 640.

Figure 7:
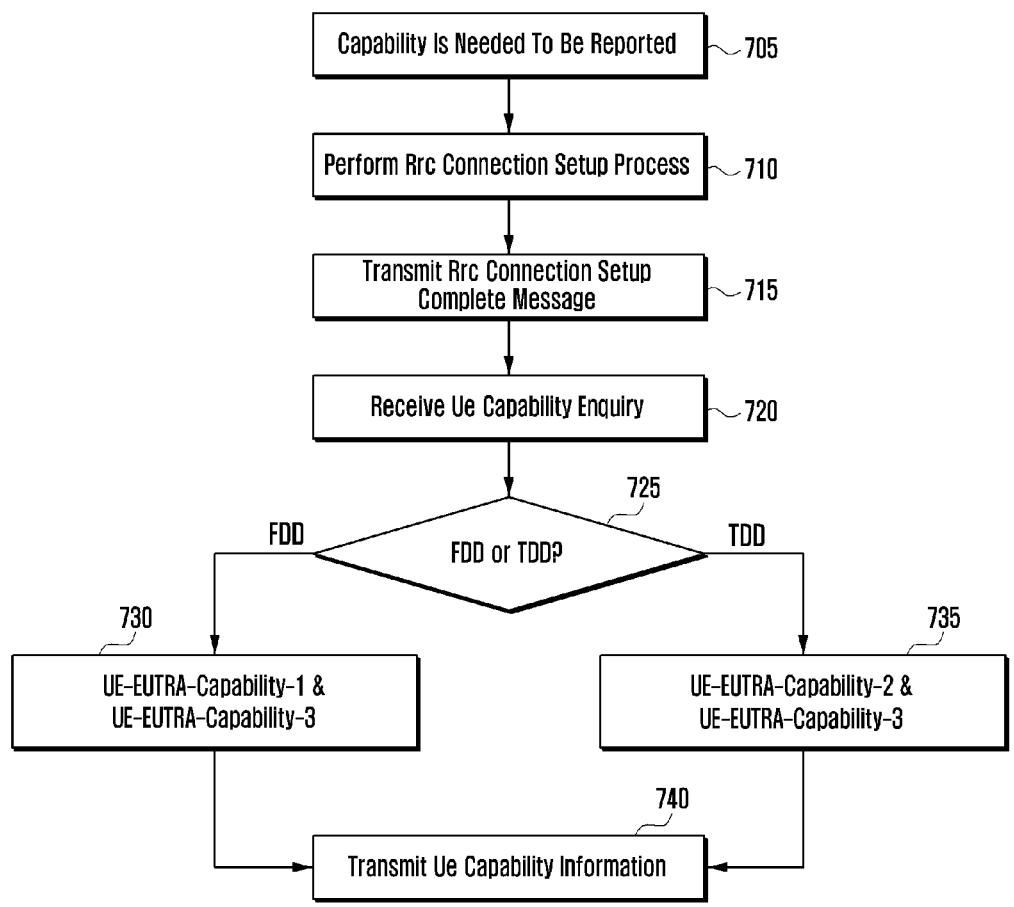
FIG. 7 illustrates a flowchart that describes a method for reporting capability information via a UE, according to a third exemplary embodiment of the present invention.

FIG. 7 illustrates a flowchart that describes a method for reporting capability information via a UE according to a third exemplary embodiment of the present invention.

The third exemplary embodiment of the present invention provides a method for supporting features and FGI sets and indicating the requirement of an IOT test in respective duplex modes. UE-EUTRA-Capability includes an FGI bit, parameters related to bands that the UE supports (rf-Parameters), a parameter related to a peak data rate of the UE (ue-Category), parameters related to physical layer capability (phyLayerParameters), parameters related to other radio access technology (interRAT-Parameters), etc. In the third exemplary embodiment of the present invention, UE-EUTRA-Capability is managed as the following three examples.

- UE-EUTRA-Capability 1: this refers to UE-EUTRA-Capability that is determined considering only an FDD band. That is, the UE 405 includes only FDD bands that it supports in the rf-Parameter and configures an FGI bit of an FGI set in such a way to indicate whether a corresponding feature group is subjected to an IOT test in an FDD band. When the UE 405 reports whether it supports optional features, e.g., a number of features included in phyLayerParameters, it reports only the features that are supported in FDD bands and have been subjected to an IOT test.
- UE-EUTRA-Capability 2: this refers to UE-EUTRA-Capability that is determined considering only a TDD band. That is, the UE 405 includes only TDD bands that it supports in the rf-Parameter and configures an FGI bit of an FGI set in such a way to indicate whether a corresponding feature group is subjected to an IOT test in a TDD band. When the UE 405 reports whether it supports optional features, e.g., a number of features included in phyLayerParameters, it reports only the features that are supported in TDD bands and have been subjected to an IOT test.
- UE-EUTRA-Capability 3: this refers to UE-EUTRA-Capability that is determined considering both FDD and TDD bands. That is, the UE 405 includes all bands that it supports in the rf-Parameter and configures an FGI bit in such a way to indicate whether a corresponding feature group is subjected to an IOT test in one or more FDD bands and one or more TDD bands, from among all the bands that it supports. When the UE 405 reports whether it supports optional features, e.g., a number of features included in phyLayerParameters, it reports the features that are supported in both FDD and TDD bands and have been subjected to an IOT test.

The three capabilities described above may be identical to each other or differ from each other. If IOT environments for FDD and TDD may differ from each other or different types of features with respect to FDD and TDD are supported, the capabilities have different values respectively.

The UE 405 determines capability information to be reported, according to a mode of a network at a time point that it transmits UE capability information. For example, the UE 405 reports UE-EUTRA-Capability 1 and UE-EUTRA-Capability 3 via an FDD network and UE-EUTRA-Capability 2 and UE-EUTRA-Capability 3 via a TDD network.

Referring to FIG. 7, an event occurs in a dual mode UE 405 such that it needs to newly report its capability information at step 705. The UE 405 performs an RRC CONNECTION SETUP process with respect to the eNB 410 at step 710. When the UE 405 establishes an RRC connection with the eNB 410, it generates an RRC CONNECTION SETUP COMPLETE message and transmits it to the eNB 410 at step 715. The message may include NAS messages, such as ATTACH REQUEST, Tracking Area Update (TAU), SERVICE REQUEST, and the like. The UE 405 may include information indicating that the UE radio capability has been altered in the NAS message.

After transmitting the RRC CONNECTION SETUP COMPLETE message to the eNB 410, the UE 405 may execute corresponding functions at step 720. In order to acquire new UE capability information regarding the UE 405, the eNB 410 may transmit a UE capability enquiry message to the UE 405 as described above, referring to FIG. 4. The message may include information that instructs the UE 405 to report EUTRA capability.

When the UE 405 receives the message from the eNB 410 at step 720, it determines whether the mode of the current network is an FDD or TDD mode at step 725. That is, the UE 405 determines whether the operating band of the current cell is an FDD or TDD band. Alternatively, the UE 405 determines whether its current operating band is an FDD or TDD band. Since the current operating band of the UE 405 always matches the operating band of the current cell, the two determining processes are substantially identical to each other. Alternatively, the UE 405 may have previously determined the mode of the current network at step 705. That is, the UE 405 may execute the processes, based on the mode of the network at a time point that it needs to report the capability information.

If it is determined that the mode of the current network is an FDD mode at step 725, the UE 405 generates the UE capability information message at step 730. The UE capability information message includes, of the EUTRA-Capability-1, serving as capability information applicable to FDD, and EUTRA-Capability-2, serving as capability information applicable to TDD, UE-EUTRA-Capability-1, serving as capability information applicable to FDD corresponding to a mode of the current network, in a legacy field, and UE-EUTRA-Capability-3, serving as capability information applicable to FDD and TDD, in an extension field. If capability information applicable to one duplex mode (i.e., EUTRA-Capability-1 or EUTRA-Capability-2) differs from capability information commonly applicable to the two duplex modes (i.e., EUTRA-Capability-3), the UE 405 reports the information regarding the two capabilities. On the contrary, if capability information applicable to one duplex mode (i.e., EUTRA-Capability-1 or EUTRA-Capability-2) is identical to capability information commonly applicable to the two duplex modes (i.e., EUTRA-Capability-3), the UE 405 reports information regarding one of the two capabilities. Therefore, if the eNB 410 receives capability information including one FGI set, it concludes that the received capability information can be applied to both TDD and FDD.

On the contrary, if it is determined that the mode of the current network is a TDD mode at step 725, the UE 405 generates the UE capability information message at step 735. The UE capability information message includes, of the EUTRA-Capability-1, serving as capability information applicable to FDD, and EUTRA-Capability-2, serving as capability information applicable to TDD, UE-EUTRA-Capability-2, serving as capability information applicable to TDD corresponding to a mode of the current network, in a legacy field, and UE-EUTRA-Capability-3, serving as capability information applicable to FDD and TDD, in an extension field. If capability information applicable to one duplex mode (i.e., EUTRA-Capability-1 or EUTRA-Capability-2) differs from capability information commonly applicable to the two duplex modes (i.e., EUTRA-Capability-3), the UE 405 reports the information regarding the two capabilities. On the contrary, if capability information applicable to one duplex mode (i.e., EUTRA-Capability-1 or EUTRA-Capability-2) is identical to capability information commonly applicable to the two duplex modes (i.e., EUTRA-Capability-3), the UE 405 reports information regarding one of the two capabilities.

The UE 405 transmits the UE capability information, including information generated at steps 730 or 735, to the eNB 410 at step 740.

Figure 8:
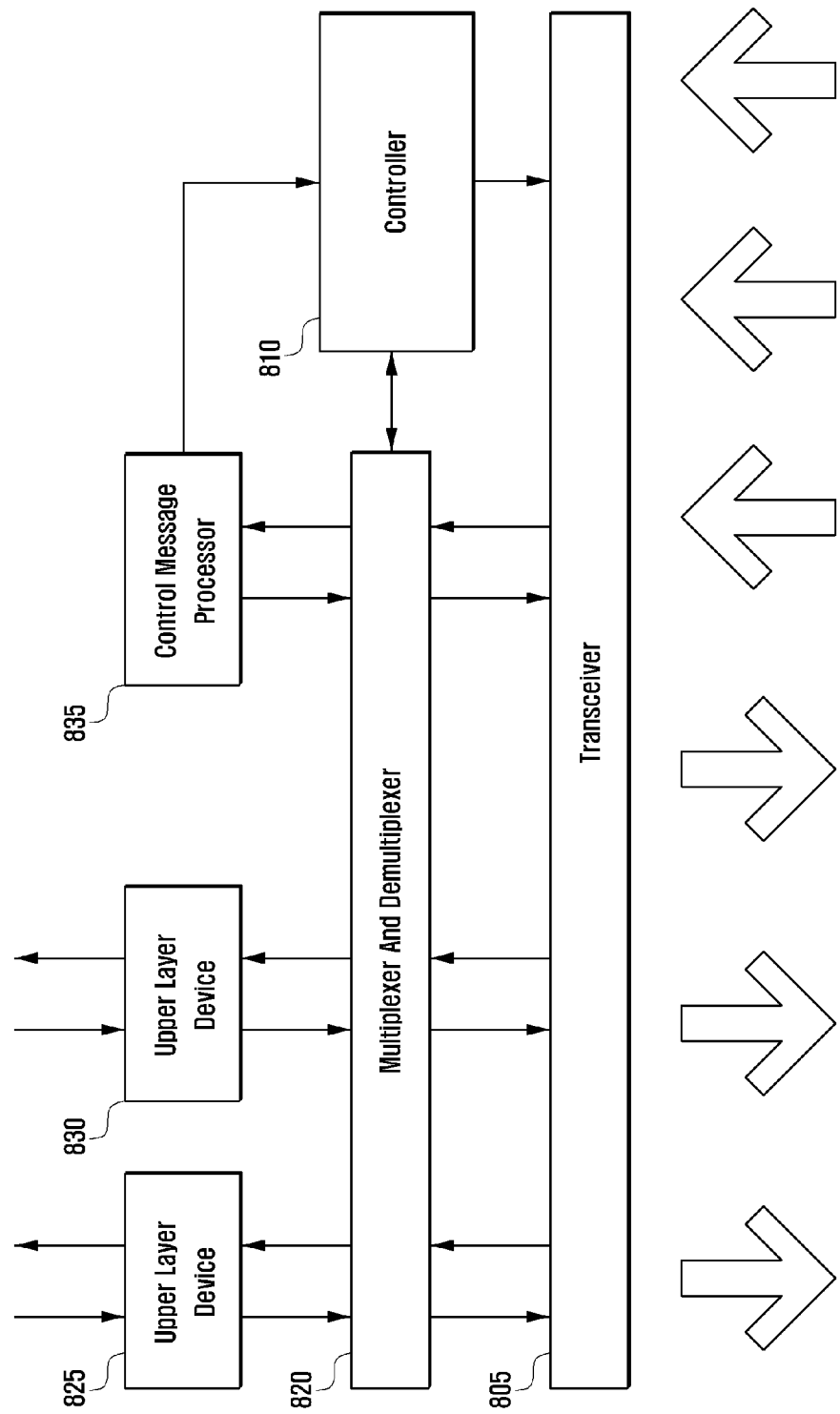
FIG. 8 illustrates a schematic block diagram of a UE according to an exemplary embodiment of the present invention.

FIG. 8 illustrates a schematic block diagram of a UE according to an exemplary embodiment of the present invention.

Referring to FIG. 8, the UE 405 includes a transceiver 805, a controller 810, a multiplexer and demultiplexer 820, a control message processor 835, and upper layer devices 825 and 830.

The transceiver 805 receives data and control signals via the forward channel of a serving cell and transmits data and control signals via the reverse channel.

The multiplexer and demultiplexer 820 multiplexes data from the control message processor 835 or the upper layer devices 825 and 830 or de-multiplexes data from the transceiver 805, and transfers the processed data to the control message processor 835 or the upper layer devices 825 and 830.

The control message processor 835 refers to an RRC layer device. The control message processor 835 processes control messages transmitted from eNB 410 and performs corresponding operations. For example, the control message processor 835 receives an RRC control message, and transfers, if the RRC control message includes DRX-related information or SPS-related information, the included information to the controller 810. The control message processor 835 processes the control messages so that the UE 405 can report the capability information as described above referring to FIGS. 4 to 7. The control message processor 835 can generate UE capability information according to the exemplary embodiments described above. The exemplary embodiments may be modified in such a way that the controller 810 generates UE capability information.

The upper layer devices 825 and 830 may be configured according to types of services. For example, the upper layer devices 825 and 830 process data, generated when user services such as File Transfer Protocol (FTP) or Voice over Internet Protocol (VoIP) services are provided, and transfer them to the multiplexer and demultiplexer 820. The upper layer devices 825 and 830 may also process data, from the multiplexer and demultiplexer 820, and transfer data to the upper layer service application.

The controller 810 receives a scheduling command via the transceiver 805, identifies the reverse grants, and controls the transceiver 805 and the multiplexer and demultiplexer 820 to transmit them as a proper transmission resource, in the reverse direction, at a proper time point. The controller 810 also sets up functions, referring to setting information transmitted from the control message processor 835. The controller 810 can control operations so that the UE 405 can report its capability information as described above referring to FIGS. 4 to 7.

Figure 9:
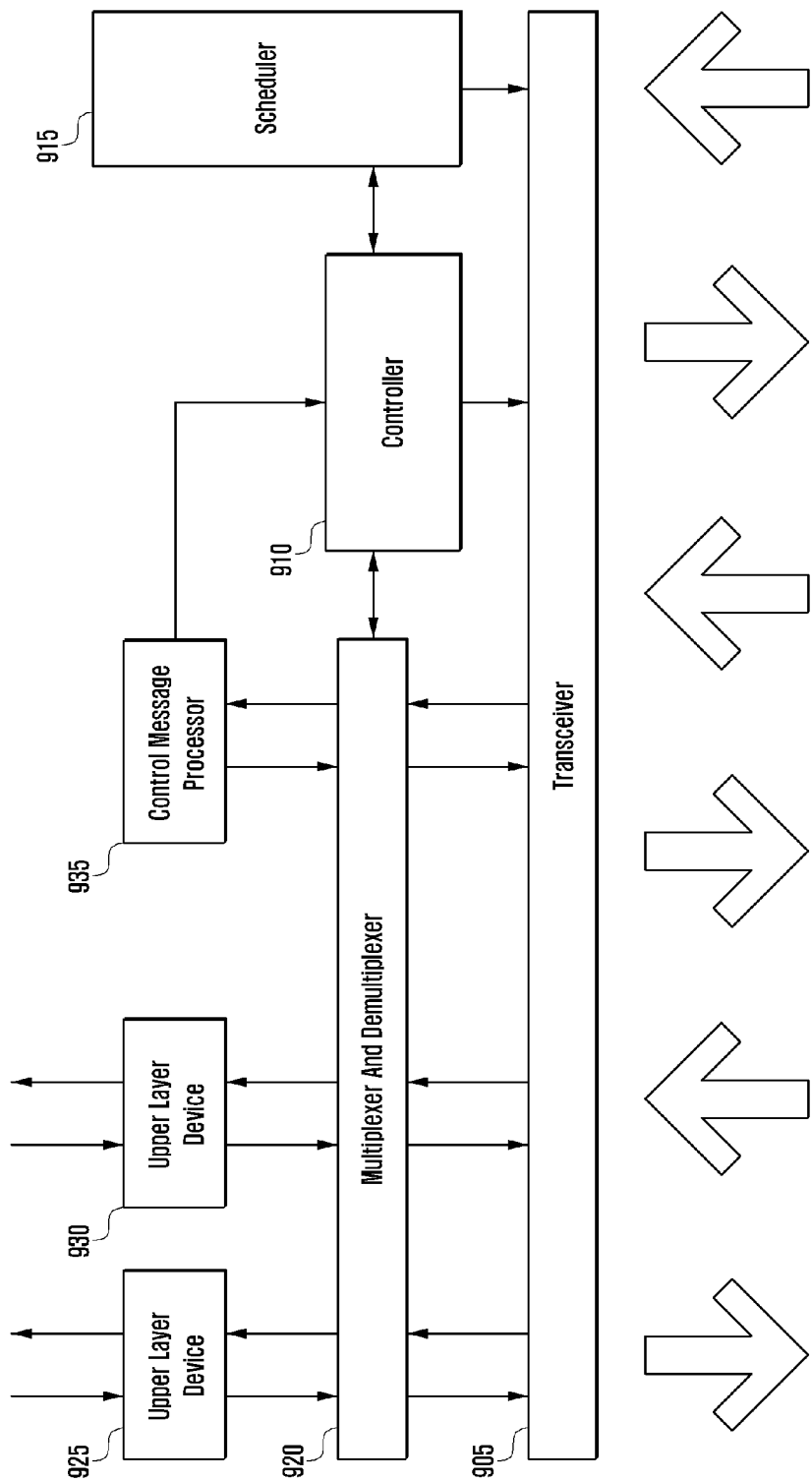
FIG. 9 illustrates a schematic block diagram of an eNB according to an exemplary embodiment of the present invention.

FIG. 9 illustrates a schematic block diagram of an eNB according to an exemplary embodiment of the present invention Referring to FIG. 9, the eNB 410 includes a transceiver 905, a controller 910, a multiplexer and demultiplexer 920, a control message processor 935, upper layer devices 925 and 930, and a scheduler 915.

The transceiver 905 transmits data and control signals via the forward carriers and receives data and control signals via the reverse carriers.

The multiplexer and demultiplexer 920 multiplexes data from the control message processor 935 or the upper layer devices 925 and 930 or de-multiplexes data from the transceiver 905, and transfers the processed data to the control message processor 935, the upper layer devices 925 and 930, or the controller 910.

The control message processor 935 processes control messages from the UE 405 and performs corresponding operations. The control message processor 935 also generates control messages to be transmitted to the UE 405 and transfers them to the lower layer. The control message processor 935 generates a UE CAPABILITY ENQUIRY message to be transmitted to the UE 405, processes UE CAPABILITY INFORMATION transmitted from the UE 405, and determines a function to set the UE 405 based on the processed information. The control message processor 935 generates an RRC CONNECTION RECONFIGURATION message based on the determination and transfers it to the multiplexer and demultiplexer 920.

The upper layer devices 925 and 930 may be configured according to bearers. The upper layer devices 925 and 930 configure data, transmitted from S-GW 130 or the other eNB, to RLC PDU, and transfer it to the multiplexer-demultiplexer 920. The upper layer devices 925 and 930 configure RLC PDU, transmitted from the multiplexer-demultiplexer 920, to PDCP SDU, and transfer it to the S-GW 130 or the other eNB.

The scheduler 915 allocates transmission resources to the UE 405 at a proper time point, considering the buffer state, the channel state, etc. The scheduler 915 processes signals transmitted from or to the UE.

The controller 910 controls operations of the eNB 410 to receive UE capability information from the UE 405 according to one of the exemplary embodiments as described referring to FIGS. 4 to 7.

More particularly, the eNB 410 receives UE capability information, extracts information regarding a corresponding capability, considering the mode where the UE capability is reported, and accordingly communicates with the UE 405.

As described above, the system and method according to exemplary embodiments of the invention can allow a dual mode UE to efficiently report its capability information.

In addition, it should be understood that the exemplary processes and operations of the mobile device, described above, can be performed via computer programming instructions. These computer programming instructions can be installed in processors of data processing equipment that can be programmed, special computers, or universal (e.g., general purpose) computers. The instructions, performed via the processors of data processing equipment or the computers, can generate means that perform functions described in blocks of the flowchart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flowchart therein. In addition, since the computer programming instructions can also be installed to computers or data processing equipment that can be programmed, they can create processes that perform a series of operations therein, described in the blocks of the flowchart therein.

The blocks of the flowcharts refer to parts of codes, segments or modules that include one or more executable instructions to perform one or more logic functions. It should be noted that the functions described in the blocks of the flowcharts may be performed in a different order from the exemplary embodiments described above. For example, the functions described in two adjacent blocks may be performed at the same time or in reverse order.

In the exemplary embodiments, the terminology, component '~ unit,' refers to a software element or a hardware element such as a Field Programmable Gate Array (FPGA), an Application Specific Integrated Circuit (ASIC), etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

The terms or words described in the description and the claims should not be limited by a general or lexical meaning, but instead should be analyzed as a meaning and a concept through which the inventor defines and describes the invention, to comply with the idea of the invention. Therefore, one skilled in the art will understand that the exemplary embodiments disclosed in the description and configurations illustrated in the drawings are only exemplary embodiments, and that there may be various modifications, alterations, and equivalents thereof to replace the exemplary embodiments at the time of filing this application.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for transmitting user equipment (UE) capability information, the method comprising:
   receiving a message requesting UE capability information;
   identifying first capability information and second capability information according to the received message, the first capability information being applicable to either a frequency division duplex (FDD) mode or a time division duplex (TDD) mode and the second capability information being applicable to both the FDD mode and the TDD mode; and
   transmitting a UE capability information message including both the first capability information and the second capability information if the first capability information is different from the second capability information.

2. The method of claim 1, further comprising:
   transmitting the UE capability information message including either the first capability information and the second capability information if the first capability information and the second capability information have the same value.

3. The method of claim 1, wherein
   the first capability information and the second capability information comprise at least one of a feature group indicator (FGI), UE specific reference signal information, a measurement gap requirement, and a physical layer parameter.

4. A user equipment (UE), the UE comprising:
   a transceiver configured to:
      receive a message requesting UE capability information, and
      transmit a UE capability information message including both first capability information and second capability information if the first capability information is different from the second capability information; and
   a controller configured to identify the first capability information and the second capability information according to the received message, the first capability information being applicable to either a frequency division duplex (FDD) mode or a time division duplex (TDD) mode and the second capability information being applicable to both the FDD mode and the TDD mode.

5. The UE of claim 4, wherein the transceiver is further configured to transmit the UE capability information message including either the first capability information and the second capability information if the first capability information and the second capability information have the same value.

6. The UE of claim 4, wherein the first capability information and the second capability information comprise at least one of a feature group indicator (FGI), UE specific reference signal information, a measurement gap requirement, and a physical layer parameter.

7. A method for receiving user equipment (UE) capability information, the method comprising:
   transmitting a message requesting UE capability information; and
   receiving a UE capability information message in response to the request message,
   wherein the UE capability information message includes both first capability information and second capability information if the first capability information is different from the second capability information, and
   wherein the first capability information is applicable to either a frequency division duplex (FDD) mode or a time division duplex (TDD) mode and the second capability information is applicable to both the FDD mode and the TDD mode.

8. The method of claim 7, wherein the UE capability information message includes either the first capability information and the second capability information if the first capability information and the second capability information have the same value.

9. The method of claim 7, wherein the first capability information and the second capability information comprise at least one of a feature group indicator (FGI), UE specific reference signal information, a measurement gap requirement, and a physical layer parameter.

10. An evolved Node B (eNB) comprising:
    a transceiver configured to:
       transmit a message requesting capability information, and receive a user equipment (UE) capability information message in response to the request message, wherein the UE capability information message includes both first capability information and second capability information if the first capability information is different from the second capability information, and wherein the first capability information is applicable to either a frequency division duplex (FDD) mode or a time division duplex (TDD) mode and the second capability information is applicable to both the FDD mode and the TDD mode.

11. The eNB of claim of 10, wherein the UE capability information message includes either the first capability information and the second capability information if the first capability information and the second capability information have the same value.

12. The eNB of claim of 10, wherein the first capability information and the second capability information comprise at least one of a feature group indicator (FGI), UE specific reference signal information, a measurement gap requirement, and a physical layer parameter.

* * * * *